Jan. 23, 1923.
E. L. CLARK.
BRACKET DEVICE FOR AIR BRAKE PRESSURE VALVES.
FILED JULY 1, 1922.
1,443,168.
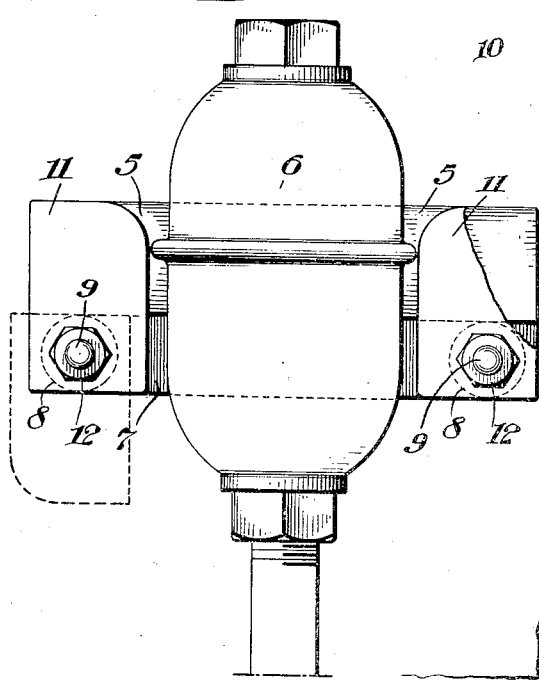
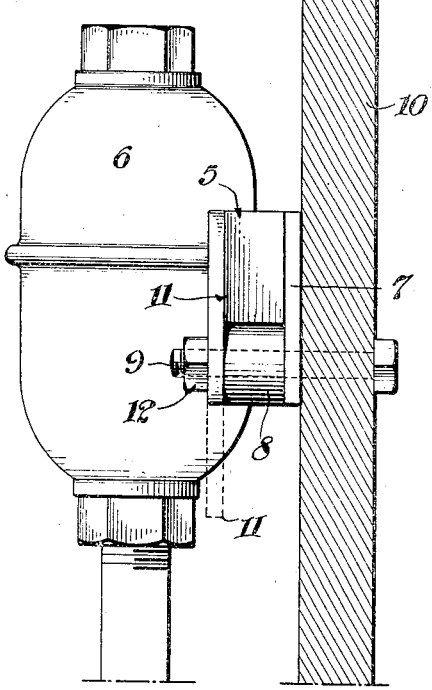
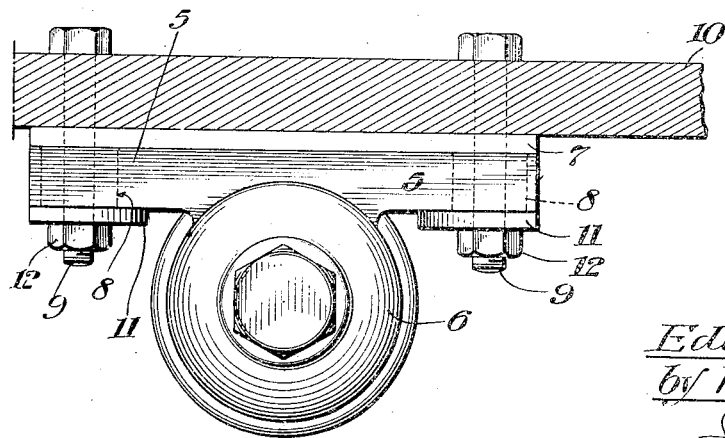
Inventor
Eddy L. Clark
by his Attorney
John R. Nolan Patented Jan. 23, 1923.

1,443,168

UNITED STATES PATENT OFFICE.

EDDY L. CLARK, OF WEST PITTSTON, PENNSYLVANIA.

BRACKET DEVICE FOR AIR-BRAKE PRESSURE VALVES.

Application filed July 1, 1922. Serial No. 572,336.

*To all whom it may concern:*

Be it known that I, EDDY L. CLARK, a citizen of the United States, and resident of West Pittston, in the county of Luzerne and State of Pennsylvania, have invented certain new and useful Improvements in Bracket Devices for Air-Brake Pressure Valves, of which the following is a specification.

The object of this invention is to provide a simple, inexpensive and efficient device for securing in place on railroad cars the pressure valves of air-brake systems; and to that end my invention comprises a novel bracket device having locking members which can be readily positioned to secure or to release the valve body, as desired, as will be hereinafter described and claimed.

In the drawings—

Figure 1 is a front elevation of a bracket device embodying my invention, said device being illustrated as mounted on one side of a car and supporting an air-brake pressure valve.

Figs. 2 and 3 are side and plan views, respectively, of the device and the associated valve, the side of the car being in section.

The novel bracket device herein illustrated is adapted to be permanently secured to the side of a railroad car, and is so constructed that the projecting lugs 5 of the usual pressure valve 6 can be readily mounted on the device and the valve thereby securely, yet detachably, supported in operative position. This bracket device in its preferred form comprises a bar or body member 7 having adjacent its respective ends forward projections 8 which, together with the body 7, are suitably perforated for the passage of bolts 9 which extend through and support the device on the outer sheathing 10 of the car. On the outer ends of the bolts are loosely supported locking members comprising perforated plates 11 which can be readily swung on the bolts to any angular position in relation to the body member 7 and then be firmly secured in place by means of nuts 12 on the outer ends of the bolts.

When the plates 11 are swung downward, as indicated by the dotted lines in Figs. 1 and 2, the body of the valve can be positioned in front of the member 7 and between the plates with the lugs 5 of the valve body resting on the bosses 8 of the bracket. Then by swinging the plates 11 upward and laterally of the lugs 5 and tightening up the nuts 12, the plates 11 are securely held in locking position, thus confining the valve and preventing its accidental displacement.

To release the valve for removal thereof for repairs or renewal it is merely necessary to loosen the nuts 12 and swing the locking members downwardly on the bolts as axes, as indicated by the dotted lines in Figs. 1 and 2.

I do not limit my invention to the exact details of construction herein disclosed as the same may be modified within the principle of my invention and the scope of the appended claims.

I claim—

1. The herein described bracket-device for air-brake pressure retaining valves having laterally-projecting lugs, said device comprising a body, spaced-apart locking members pivotally mounted on said body and adapted to be positioned to permit the mounting of the valve on said body and the retention of the lugs between the said members and the body, and means for locking or releasing said members.

2. The herein described bracket-device for air-brake pressure retaining valves having laterally-projecting lugs, said device comprising a body having spaced-apart forward projections adapted to afford seats for the lugs of a valve interposed between said projections, pivotally supported locking members associated with said projections, and means for locking or releasing said members.

3. The herein described bracket-device for air-brake pressure retaining valves having laterally-projecting lugs, said device comprising a body having spaced-apart forward projections, said body and projections being perforated for the passage of bolts, bolts extending through said body and projections, locking members on the outer ends of said bolts, and nuts on said bolts for securing the members in position.

Signed at Pittston in the county of Luzerne and State of Pennsylvania, this 29th day of June, 1922.

EDDY. L. CLARK.